United States Patent [19]

Chen

[11] Patent Number: 5,630,145
[45] Date of Patent: May 13, 1997

[54] METHOD AND APPARATUS FOR REDUCING POWER CONSUMPTION ACCORDING TO BUS ACTIVITY AS DETERMINED BY BUS ACCESS TIMES

[75] Inventor: David Y. Chen, Taipei, Taiwan

[73] Assignee: United Microelectronics Corp., Hsinchu, Taiwan

[21] Appl. No.: 435,351

[22] Filed: May 5, 1995

[51] Int. Cl.$^6$ ........................................ G06F 1/32
[52] U.S. Cl. .................. 395/750; 395/306; 364/707
[58] Field of Search ........................ 395/750; 364/707

[56] References Cited

U.S. PATENT DOCUMENTS

| | | | |
|---|---|---|---|
| 5,029,272 | 7/1991 | Fourcroy et al. | 327/91 |
| 5,113,518 | 5/1992 | Durst, Jr. et al. | 395/550 |
| 5,167,024 | 11/1992 | Smith et al. | 395/375 |
| 5,396,602 | 3/1995 | Amini et al. | 395/293 |
| 5,396,635 | 3/1995 | Fung | 395/800 |

*Primary Examiner*—Jack B. Harvey
*Assistant Examiner*—Sumati Lefkowitz
*Attorney, Agent, or Firm*—Cushman Darby & Cushman, IP Group of Pillsbury Madison & Sutro, LLP

[57] ABSTRACT

A power conservation computer architecture is provided for disabling a clock signal to all peripheral devices and bus controllers located on a plurality of Peripheral Component Interconnect (PCI) buses when it is determined that all of the PCI buses are idle. The PCI buses are determined to be idle through the use of a Power Management Unit (PMU) controller connected to the first of the plurality of PCI buses. The PMU controller first determines and stores in memory a time constant corresponding to the amount of time required for the PMU controller to read the head configuration of the farthest peripheral device from the PMU controller when there is no activity on any of the buses. Then, during the operation of the computer architecture, if the first PCI bus is determined to be idle, a comparison is made between the time constant and a measurement of the length of time required to read the head configuration of the farthest peripheral device from the PMU controller. If the time to access the head configuration is less than the time constant plus a predetermined time constant, thereby indicating that there is no activity on any of the PCI buses, a clock signal from the PMU controller is stopped, thus placing the bus controllers and peripheral devices in a reduced power consumption state. The clock signal to the bus controllers and peripheral devices is resumed by the PMU controller when an asynchronous signal is sent from the peripheral devices or bus controllers to the PMU controller to indicate that data exchange on the PCI buses will be occurring.

11 Claims, 4 Drawing Sheets

METHOD AND APPARATUS FOR REDUCING POWER CONSUMPTION ACCORDING TO BUS ACTIVITY AS DETERMINED BY BUS ACCESS TIMES

BACKGROUND OF THE INVENTION

1. Field of Invention

The invention relates to a personal computer system, and more specifically to power management for peripheral component interface (PCI) buses in the personal computer system.

2. Description of Related Art

Generally, power supply is necessary for the operation of an electronic device, and power consumption is an important issue in the performance of an electronic device, especially in a battery-powered personal computer. For a digital electronic instrument, such as a computer system, almost all the components are operated by the application of electrical power as well as a variety of control signals. However, all the components of a normally operated computer system need not always remain in an active mode. Even though some of the components are temporarily powered off, the performance of the computer system is not affected. Therefore, through careful management of the power supply and control signals, a reduction of power consumption of the computer system can be achieved.

There are various buses and peripheral devices in the personal computer which consume a lot of electrical power even in an idle mode. Therefore, various power management arrangements have been developed. For example, a power management unit (PMU) in charge of the power supply and control signals of the components has been developed. The function of the PMU is first to determine when any components are inactive and then to save power by turning off the clock signal to them or by lowering the frequency of the clock signal.

However, although the PMU can reduce the power consumption of the computer system somewhat, it is not easy to connect the PMU with a PCI bus. The main difference between the PCI bus and other bus standards, such as the ISA (Industrial Standard Architecture) bus, EISA (Extended Industrial Standard Architecture) bus and micro channel bus is that the PCI bus has a hierarchical structure. A hierarchical bus structure consists of a plurality of buses arranged in parallel. the problem with the PMU in such a structure is that the PMU tends to misjudge the operating modes of the components, thus failing to keep the computer system operating normally. Referring to FIG. 1 (Prior Art), a hierarchical bus structure is depicted wherein a first PCI bus 60, a second PCI bus 70 and a third PCI bus 80 are connected in parallel through bus bridges (or bus controllers) 33 and 34. The three PCI buses 60, 70 and 80 operate both independently and concurrently. First PCI bus 60 exchanges data with a central processing unit (CPU) 10 and memory devices 12, 14 and 16 through bus bridge 31 and a local bus 50. An ISA bus 90 is connected to first PCI bus 60 through a bus bridge 32. Each of the three PCI buses 60, 70 and 80 is connected to a plurality of peripheral devices for data communication. For example, peripheral controller 21 for VGA signal output is connected to first PCI bus 60, peripheral controller 23 for data exchanging with a primary storage device is connected to first PCI bus 60, and peripheral controllers 26 for a secondary storage device and peripheral controller 27 for connecting a local area network (LAN) are both connected to third PCI bus 80.

The power management unit of standard the hierarchical PCI bus structure is a PMU controller 30 connected to first PCI bus 60. PMU controller 30 sends out a clock signal PCLK to control all the bus bridges and peripheral devices connected directly to first PCI bus 60, while the components on other PCI buses are controlled by reproduced clock signals from bus bridges 32, 33 and 34. In the standard configuration, the PMU would determine whether to turn the clocks of all devices ON or OFF based on the activity status of the first PCI bus but could not consider the status of the other buses. For example although first PCI bus 60 is in the idle mode, it is possible that data exchange between third PCI bus 80 and the LAN is still taking place. If the PMU controller 30 stops sending the clock signal or lowers the frequency of the clock signal when first bus 60 is idle in order to reduce power consumption, the data communication between the computer and the network will be interrupted, thus causing difficulties, such as the loss of data or even the crash of the computer.

Moreover, since PMU controller 30 has no information about the status of local bus 50, to stop sending the clock signal in accordance with the status of first PCI bus 60 may prevent CPU 10 from obtaining data from peripheral controllers through PCI bus 60. Therefore, the computer easily crashes due to the incomplete status detection of other buses by PMU controller 30. This problem can be solved by combining PMU controller 30 and bus controller 31 into a single entity. However the status of ISA bus 90 still can not be detected. That is, the status of local bus 50 and ISA bus 90 can not be sensed by PMU controller 30 at the same time, and thus there is no way to properly control the ON/OFF states of the clock signal, since the PMU cannot monitor the activity of all of the buses.

SUMMARY OF THE INVENTION

To solve the above-described problem, the present invention provides a PMU controller to only stop sending the clock signal when all the buses in the personal computer are idle, thus reducing the power consumption without causing any of the aforementioned difficulties.

The invention provides a PMU controller to send a clock signal whenever it detects a request from any of the components on any of the buses.

These and other advantages are achieved by a computer in which a PCI bus structure with a plurality of peripheral devices are provided. In the present invention, the PMU controller has a memory device for storing a head configuration and a time constant corresponding to the time it takes for the farthest peripheral device from the PMU controller to communicate the head configuration to the PMU controller. When the PCI buses are idle and the time to read the head configuration from the farthest peripheral device is less than the stored time constant, the clock signal from the PMU controller to the peripheral devices is stopped, thus turning off the peripheral devices and reducing power consumption.

If data exchange with the PCI buses is requested, an asynchronous signal is sent from the peripheral devices to the PMU controller. Upon receipt of the asynchronous signal, the PMU controller will send out the clock signal again and the peripheral devices will thus recover their normal operation.

DETAILED DESCRIPTION OF THE PREFERRED EMBODIMENTS

Figure 1:
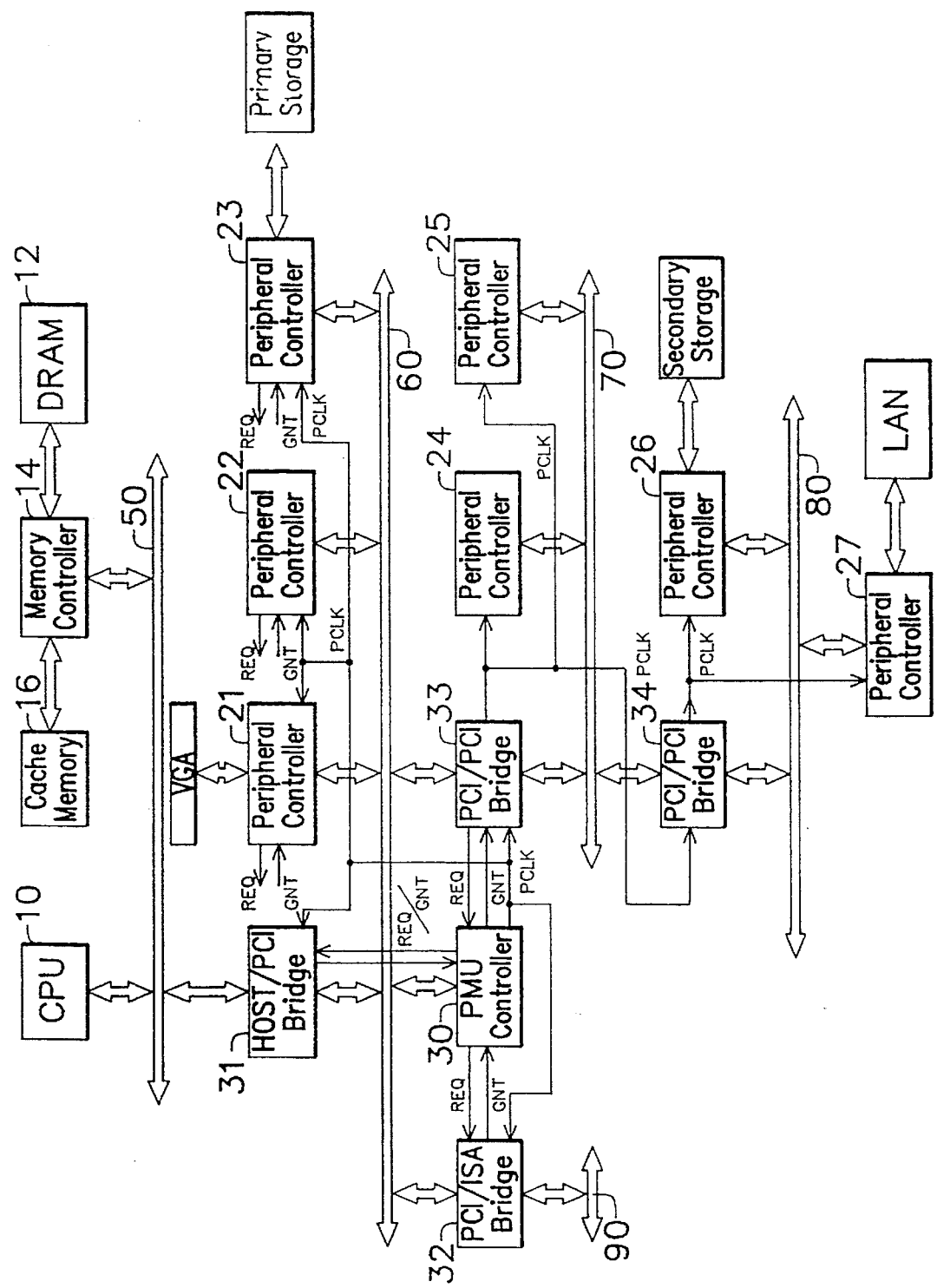
FIG. 1 (Prior Art) is a block diagram illustrating a hierarchical PCI bus structure in a personal computer system.
Figure 2:
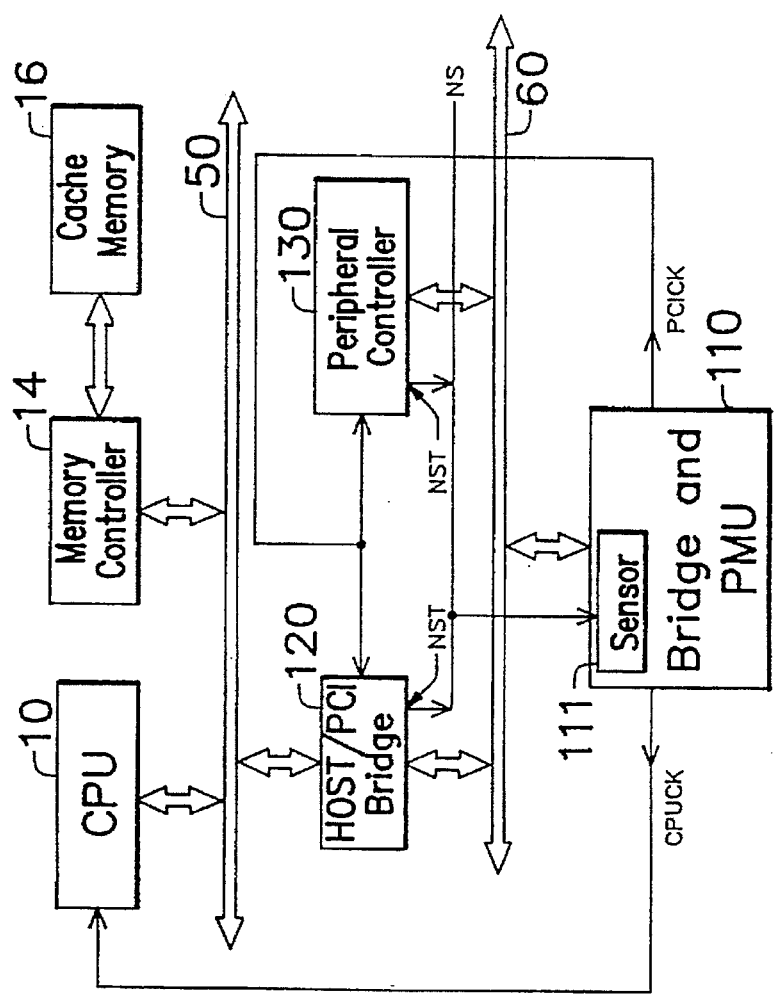
FIG. 2 is a schematic diagram in accordance with a preferred embodiment of the present invention.

FIG. 2 is a block diagram illustrating a preferred embodiment of the invention. Referring to FIG. 2, a bridge and PMU controller 110, which is a hybrid of the PMU controller and a bus controller, connects to first PCI bus 60. PCI bus 60 connects to local bus 50 through another bus bridge 120, thus exchanging data with CPU 10 and memory devices 14 and 16. A peripheral controller 130 is connected to first PCI bus 60. Signal generating means, such as asynchronous signal ends AST, are provided both by bus bridge 120 and peripheral controller 130 for sending out an asynchronous signal AS. Each asynchronous signal end AST can be an open-drain end. A sensor 111 for detecting the asynchronous signal is provided by bridge and PMU controller 110.

Open-drain ends AST, which are provided by various metal oxide semiconductor (MOS) transistors, can connect to a common detecting end and send out asynchronous signal AS without interfering with each other. To provide the open-drain ends, the gates of the MOS transistors are controlled by the bus bridge or the peripheral controller while the drains are open-circuited for sending out the asynchronous signal. Namely, a low-level signal will appear on the open-drain end if the MOS transistor is turned on, and it is detected by the common detecting end without affecting the status of other transistors. Therefore, whenever the peripheral controller and the PCI bus are about to initiate a data exchange, an asynchronous signal AS can be sent to signal detecting means 111 from the open-drain ends AST of the peripheral devices. Once this signal is received by the detecting means, the PMU will enable the clock signals PCICK and CPUCK enabling all the peripheral devices.

However, since asynchronous signal AS is not a standard signal of the computer system, some external peripheral components, especially those connected to the farthest PCI bus from first PCI bus 60, provide no open-drain end. Therefore, an alternative power management style is necessary to accompany the present invention.

Figure 3:
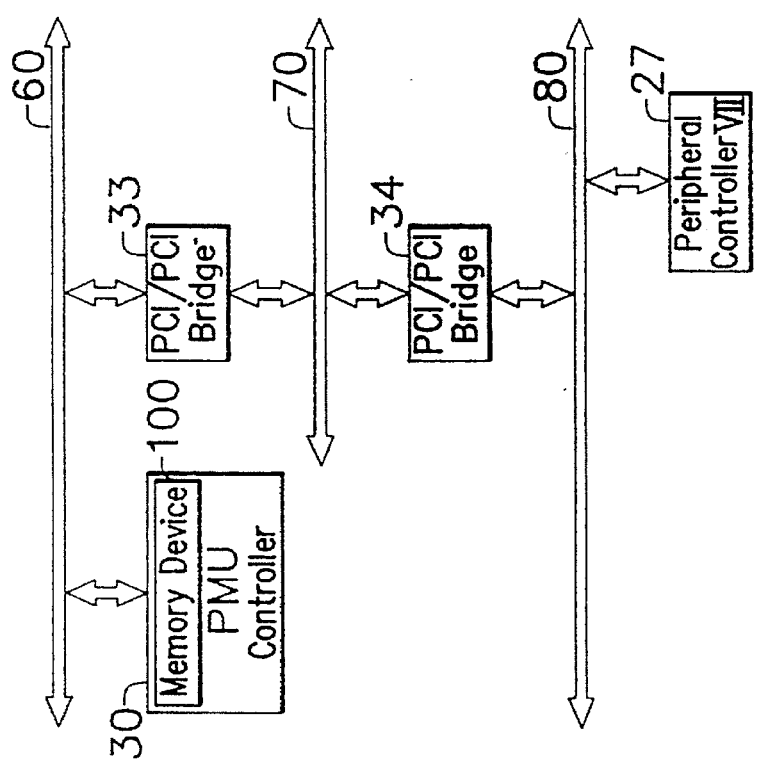
FIG. 3 is a schematic diagram of an alternative embodiment according to the invention.

The power management configuration of an alternative embodiment of the invention is depicted in FIG. 3. In the drawing, a memory device 100, such as a register, is provided by PMU controller 30. When a personal computer is powered on, a power-on-self-test (POST) process will be carried out. The POST process runs the programs in a basic input/output system (BIOS) of the computer to check out the system conditions. Each component of the computer has an identified number which records the characteristics of the component. The identified number of a peripheral device consists of a head configuration and other messages. In the present invention, the head configuration of a farthest peripheral component is accessed and stored in memory device 100 for reference during the POST process.

For example, referring to FIG. 3, PMU controller 30 is connected to first PCI bus 60. A specific peripheral device 27, such as a peripheral controller for connecting LAN, exchanges data with first PCI bus 60 through third PCI bus 80, bus controller 34, second PCI bus 70 and bus controller 33. Peripheral controller 27 is therefore the farthest component in the computer system from first PCI bus 60. Therefore, through the programming of the BIOS in the POST process, all components other than peripheral controller 27 are disabled, and PMU controller 30 then reads out the head configuration of peripheral controllers 27 in few PCI clock cycles. The time required to obtain the head configuration, that is, the number of PCI clock cycles, is denoted as a first time constant TI. Time constant TI is an important parameter for the justification of the bus status. The head configuration and the time constant TI are then recorded in memory device 100.

In case first PCI bus 60 is idle during computer normal operation, PMU controller 30 will try to read the head configuration of peripheral controller 27 again. At this time, it will also start a timer TB to count the clock cycles until completion of the read operation. If all the PCI buses are idle, the reading process will be easily carried out. Any bus having data exchange with peripheral components will interrupt the reading process. For example, when second PCI bus 70 exchanges data with a peripheral controller, second PCI bus 70 is under the control of bus controller 33. The head configuration reading process of peripheral controller 27 will be delayed until the data exchange of second PCI bus 70 finished. The reading process will continue only when second PCI bus 70 is again under the control of PMU controller 30. Therefore, the second time constant TB to obtain the head configuration will be much longer than TI which is stored in memory device 100. By comparing TI and TB, it is easy to determine whether any of the buses are idle. If TREQ is a predetermined time constant and equation $$TB \leq TI + TREQ$$

is satisfied, the PCI buses are without doubt in the idle state. Thus, the clock signal can be stopped to reduce the power consumption without interfering with a data transmission or another bus. The value of TI+TREQ, which is a first time constant of the invention, can be determined and stored in memory device 100 for reference during the POST process.

Since there is a possibility that the three PCI buses will finish their jobs at the same time and prepare for another job, they momentarily erroneously facilitate the reading process of peripheral controller 27. If PMU controller 30 stops sending the clock signal this moment, the jobs that the PCI buses were about to execute may be interrupted. In order to avoid such accident, a second reading process as a checking process may be carried out after a first predetermined period, T1. The second reading process is performed at the beginning of a second time period T2 in which the clock signal is sent again from PMU controller 30 to all components. Time periods T1 and T2 can be preset and are adjustable. The value of T1 is preferably larger than T2. Therefore, a third time constant TB' can be obtained in the checking process of PMU controller 30 by determining the read time of the header information. If third time constant TB' is smaller than first time constant, the clock signal CLK may be stopped again when time period T2 expires. Otherwise, clock signal CLK continues to be supplied from PMU controller 30, and the peripheral devices and buses exchange data as usual. The checking process may be repeated as desired to completely avoid any above-mentioned accident.

Figure 4:
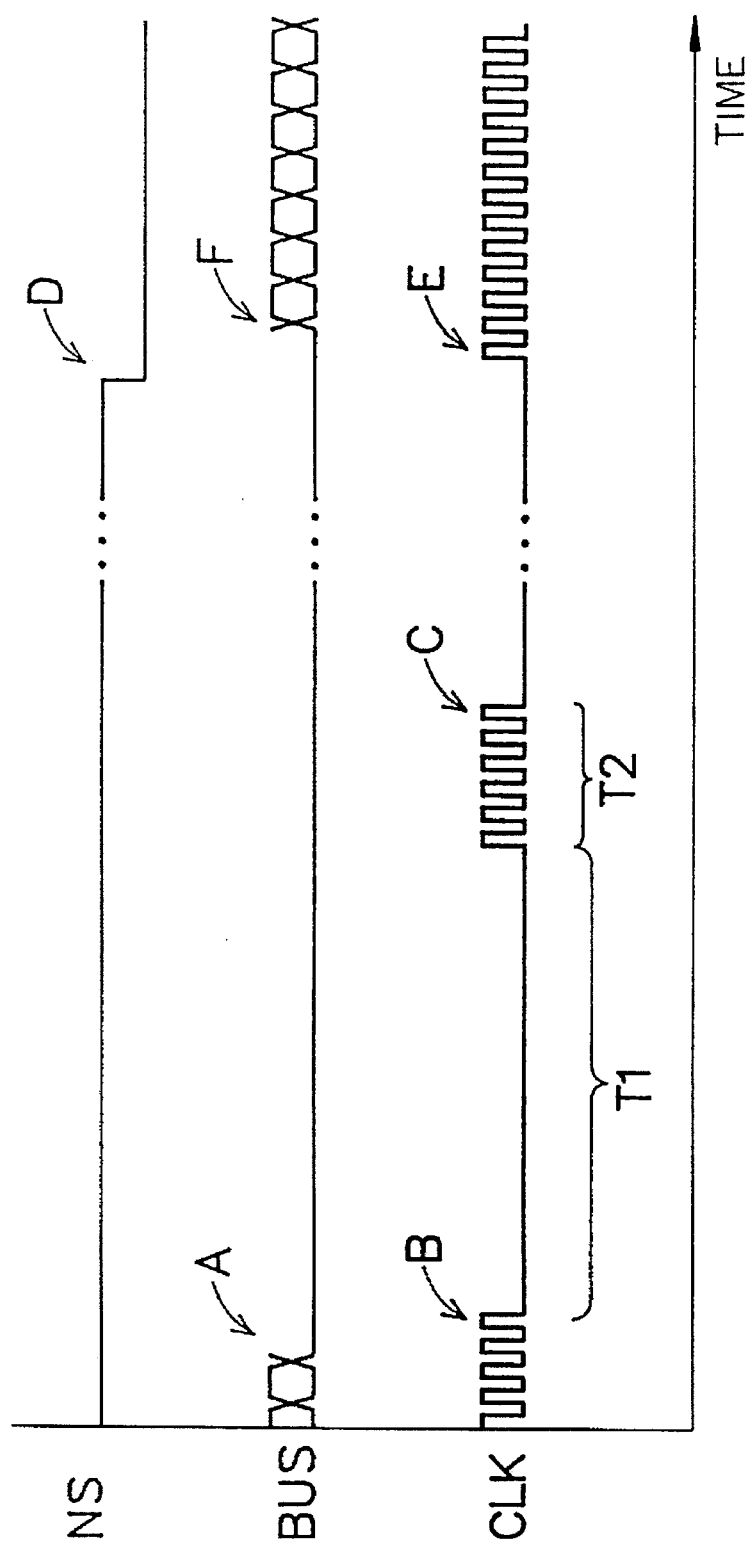
FIG. 4 is a timing diagram illustrating the operation of FIGS. 2 and 3.

The circuits of FIG. 2 and FIG. 3 are now combined as an example. FIG. 4 is a time diagram illustrating the relationships between asynchronous signal AS, data on bus BUS and clock signal CLK. As shown in the drawing, all buses become idle at point A and the second time constant TB obtained by PMU controller 30 is smaller than the first time constant TI which is stored in memory device 100. Then PMU controller 30 stops sending CLK at point B. During period T1, all peripheral devices are disabled due to the absence of clock signal CLK. As period T1 expires, the clock signal reappears to provide the second reading process, i.e., the checking process. Since the bus is really in the idle state, the third time constant is smaller than the first time constant TI, thus, the clock signal stops after time period T2 at point C as shown in the figure. At point D, the peripheral devices are about to initiate a data exchange with the bus, and the open-drain end AST is pulled low and asynchronous signal AS is sent to the PMU controller. The asynchronous signal causes PMU controller 30 to send out the clock signal CLK again at point E. Therefore, the bus is busy again at point F.

Though the power management circuits and methods described above can completely solve the problems with a hierarchical PCI bus structure, the description is not to be construed in a limiting sense. Various modifications of the illustrative embodiment of the invention will be apparent to those skilled in the art and it is contemplated that the appended claims will cover any such modifications that fall within the scope of the invention.

What is claimed is:

1. A power management method for a computer, the computer including a plurality of Peripheral Component Interconnect (PCI) buses, a plurality of bus controllers for controlling the PCI buses, each bus controller being capable of generating an asynchronous signal, a plurality of peripheral devices connected to the PCI buses, each peripheral device being capable of generating an asynchronous signal, a Power Management Unit (PMU) controller connected to a first of the PCI buses the PMU controller being capable of detecting an asynchronous signal generated by any one of the bus controllers or peripheral devices, the method comprising the steps of:

sending clock pulses to the peripheral devices, storing a first time constant in a memory, reading a head configuration of a peripheral device to obtain a second time constant, detecting an asynchronous signal generated by any one of the bus controllers or peripheral devices, stopping the sending of a clock signal to the bus controllers and the peripheral devices when the second time constant is smaller than the first time constant plus a predetermined time constant greater than or equal to zero, and restarting the clock signal when the asynchronous signal generated by any one of the bus controllers or peripheral devices is detected by the PMU controller.

2. The power management method of claim 1, further comprising the step of determining the first time constant during a power-on-self-test process of the computer.

3. The power management method of claim 1, wherein the first time constant corresponds to the time needed for the PMU controller to read the head configuration when all the peripheral devices other than the specific peripheral device are disabled.

4. The power management method of claim 1, wherein the head configuration is the head configuration of a peripheral device which is connected to a PCI bus which has the most intervening buses between itself and the first PCI bus.

5. The power management method of claim 1, wherein the bus controllers and the peripheral devices are enabled by the clock signal.

6. The power management method of claim 1 further comprising the step of checking after the clock signal is stopped for a first time period and again reading to obtain a third time constant and stopping the sending of the clock signal again when the third time constant is smaller than the first time constant plus a predetermined third time constant greater than or equal to zero.

7. The power management method of claim 6, wherein the clock signal is supplied from the PMU controller for a second time period to execute the checking process.

8. The power management method of claim 7, wherein the second time period is shorter than the first time period.

9. The power management method of claim 6 further comprising a plurality of the checking steps.

10. A computer arrangement, comprising:

a plurality of Peripheral Component Interconnect (PCI) buses, a plurality of bus controllers for controlling the PCI buses, each bus controller including a signal generator for generating an asynchronous signal, a plurality of peripheral devices connected to the PCI buses, each peripheral device including a signal generator for generating an asynchronous signal, a power management unit (PMU) controller connected to a first of the PCI buses, the PMU controller including a signal detector for detecting an asynchronous signal generated by any one of the bus controllers or peripheral devices, the PMU controller stopping the sending of a clock signal to the bus controllers and the peripheral devices when all of the plurality of PCI buses are idle and restarting the clock signal when an asynchronous signal is detected by the PMU controller, and a memory device provided by the PMU controller for storing a head configuration and a first time constant corresponding to a specific one of the peripheral devices and a second time constant corresponding to the length of time needed for the PMU controller to read the head configuration from the specific peripheral device, the specific peripheral device being one of the peripheral devices which is connected to the PCI bus which has the most intervening buses between itself and the first PCI bus, wherein if the second time constant is smaller than the first time constant plus a predetermined time constant greater than or equal to zero, the PMU controller stops the sending of the clock signal to the bus controllers and the peripheral devices.

11. A computer arrangement, comprising:

a plurality of Peripheral Component Interconnect (PCI) buses, a plurality of bus controllers for controlling the PCI buses, each bus controller including a signal generator for generating an asynchronous signal, a plurality of peripheral devices connected to the PCI buses, each peripheral device including a signal generator for generating an asynchronous signal, a power management unit (PMU) controller connected to a first of the PCI buses, the PMU controller including a signal detector for detecting an asynchronous signal generated by any one of the bus controllers or peripheral devices, the PMU controller stopping the sending of a clock signal to the bus controllers and the peripheral devices when all of the plurality of first PCI buses are idle and restarting the clock signal when an asynchronous signal is detected by the PMU controller, and a memory device provided by the PMU controller for storing a head configuration and a first time constant corresponding to a specific one of the peripheral devices and a second time constant corresponding to the length of time needed for the PMU controller to read the head configuration from the specific peripheral device, the first time constant determined by the time needed for the PMU controller to read the head configuration when all the peripheral devices other than the specific peripheral device are disabled, wherein if the second time constant is smaller than the first time constant plus a predetermined time constant greater that or equal to zero, the PMU controller stops the sending of the clock signal to the bus controllers and the peripheral devices.

* * * * *